May 23, 1944. W. K. BECKWITH 2,349,401
PORTABLE ELECTRIC TOOL
Filed Jan. 21, 1942 2 Sheets-Sheet 1

INVENTOR.
W. K. Beckwith
BY Lieber & Lieber
ATTORNEYS.

May 23, 1944.  W. K. BECKWITH  2,349,401
PORTABLE ELECTRIC TOOL
Filed Jan. 21, 1942  2 Sheets-Sheet 2
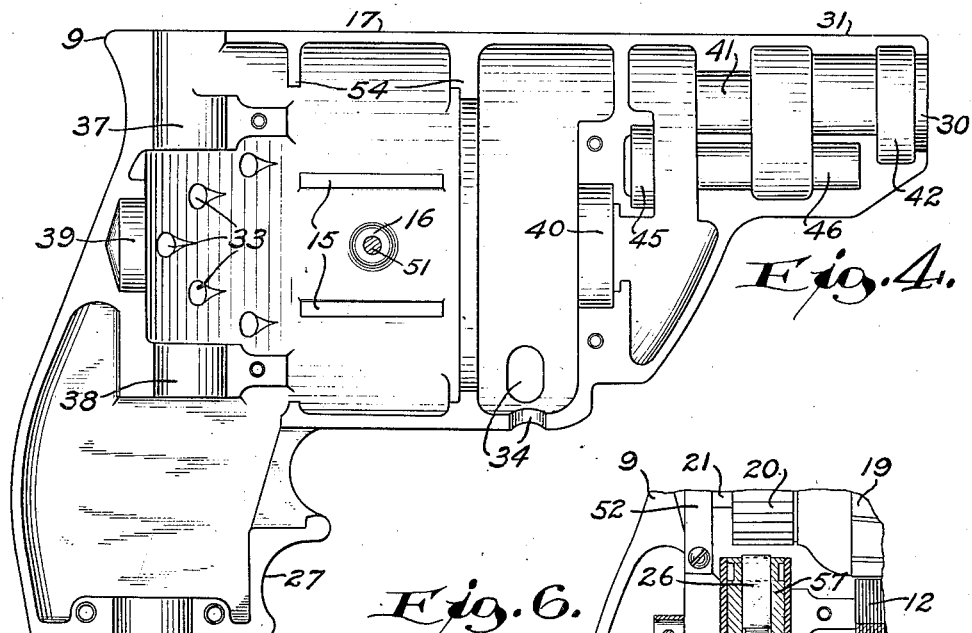
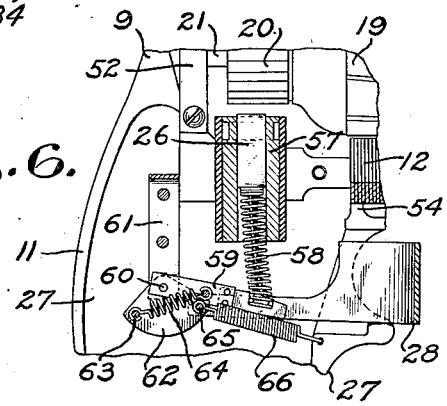
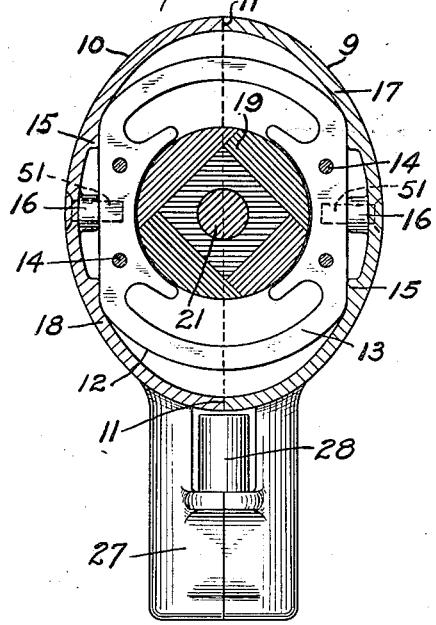
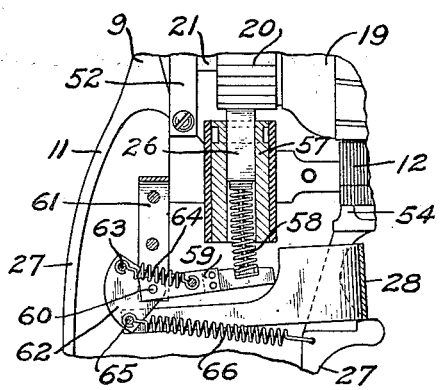
INVENTOR.
W. K. Beckwith
BY Lieber & Lieber
ATTORNEYS.

Patented May 23, 1944

2,349,401

UNITED STATES PATENT OFFICE 2,349,401

PORTABLE ELECTRIC TOOL

Wendell K. Beckwith, Whitewater, Wis., assignor to Milwaukee Electric Tool Corporation, Milwaukee, Wis., a corporation of Wisconsin Application January 21, 1942, Serial No. 427,635

11 Claims. (Cl. 172—36)

The present invention relates generally to improvements in portable tool assemblages, and relates more specifically to various improvements in the construction and operation of portable electric tools of the pistol grip trigger controlled type.

An object of the present invention is to provide an improved portable electric tool assemblage which is simple and compact in construction, and highly flexible and efficient in operation.

It has heretofore been proposed to provide various forms of portable electric tools of the type wherein the electric propelling motor is confined within a pistol grip casing and is controllable by means of a trigger actuated switch to drive a tool rotating spindle journalled within and projecting from the barrel of the pistol assemblage. In order to produce a practical tool of this type, it is necessary to provide a relatively powerful motor confined within limited space; and because relatively small and compact control and motion transmitting mechanisms must also be employed, it is desirable to be able to assemble the parts in compact groups which are independently insertible and removable. It is furthermore desirable to have these mechanisms quickly and conveniently accessible for inspection. In the prior portable pistol grip tool units, the limitations imposed by the size of the housing casing did not permit the use of a sufficiently powerful motor, and these rather bulky assemblages could not be used in relatively inaccessible places. The motor housing casings of the prior pistol grip tool assemblages were ordinarily formed of a series of end coacting sections disposed in series from one end of each tool to the other, and this type of assemblage made it tedious to expose or to inspect the internal parts without considerable loss of time and difficulty. The prior devices of this type were also difficult to construct and to assemble, and the delicate control and motion transmitting mechanisms were not amply protected against the abuse to which such tools are normally subjected.

It is therefore a more specific object of my present invention to provide a new and useful portable electric tool unit of the motor driven pistol-grip trigger controlled type, which obviates all of the above mentioned objectionable features.

Another object of this invention is to provide an improved motor driven piston grip tool assemblage wherein a powerful electric propelling motor of sturdy construction is snugly and safely confined within a compact and attractive housing and in which the mechanism can be idly operated while exposed to view.

A further object of the invention is to provide an improved enclosure for the motor and for the control and transmission mechanisms of a portable electric tool, which will permit convenient and rapid access to all normally concealed parts, and which also facilitates manufacture and assembly of such devices.

Still another object of my invention is to provide an improved pistol grip electric tool wherein only two casing sections of simple and sturdy construction and of highly attractive appearance, are utilized to protectively conceal all of the working parts, in such manner that the tool may be manipulated in relatively restricted and inaccessible places such as corners.

An additional object of the invention is to provide an improved pistol grip trigger controlled portable electric tool unit which is compact and durable in structure, readily manipulable, and adapted to be manufactured at moderate cost due to elimination of difficult machining operations.

These and other specific objects and advantages of the invention will be apparent from the following detailed description.

A clear conception of the several improved features and of the mode of constructing and of manipulating a portable electric tool embodying the same, may be had by referring to the drawings accompanying and forming a part of this specification wherein like reference characters designate the same or similar parts in the various views.

Fig. 4 is an inside plan view of the main casing section alone, devoid of all parts normally associated therewith;

Fig. 5 is a transverse section through the casing taken along the line 5—5 of Fig. 1 but showing an end view of the motor rotor;

Fig. 6 is a somewhat diagrammatic side view of the movable brush control for energizing the motor showing the trigger mechanism in inactive position; and Fig. 7 is a similar diagrammatic view, showing the trigger mechanism in action as when the motor is operating.

Figure 1:
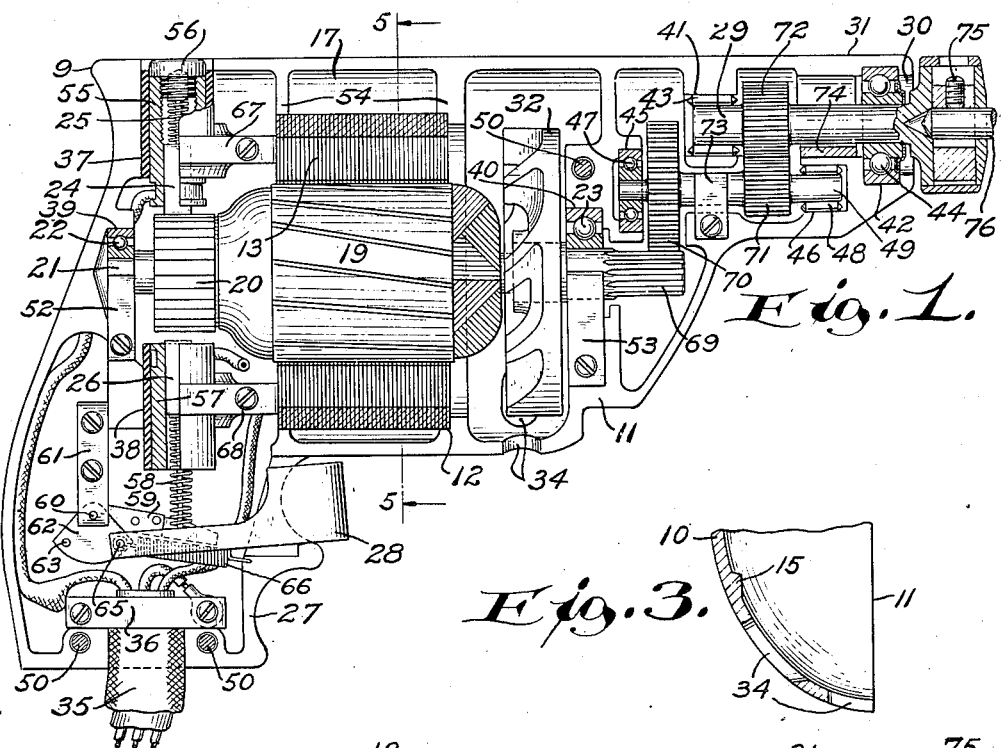
Fig. 1 is a plan view of the interior of one of the improved pistol grip trigger controlled portable electric tool units with the enclosing or cover section of the casing removed so as to reveal the working parts.
Figure 3:
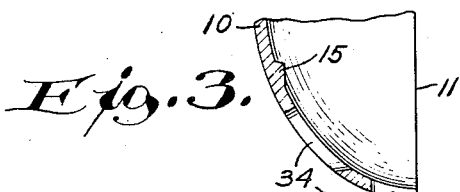
Fig. 3 is a transverse section through a fragment of the casing cover section, taken along the line 3—3 of Fig. 2.

The fact that the invention has been shown and described herein as having been embodied in a portable pistol-grip trigger-controlled electric motor driven tool of the type especially adapted to "shoot" holes with the aid of a particular type of compact chuck cooperating with an ordinary twist drill, should not be regarded as an intent to unnecessarily restrict the scope or utility of the improved tool assemblage.

Referring to the drawings, the improved portable tool specifically shown therein, comprises in general, a main casing section 9 and a closure or cover section 10 coacting therewith in clam-shell fashion along a single plane surface 11 extending from side to side and from end to end of both sections 9, 10; an electric motor having a fixed field core 12 formed of a series of laminations 13 interconnected by rivets 14 and coacting with elongated and circular pads 15, 16 formed within the medial elliptical portions 17, 18 of the casing sections 9, 10, and also having a rotor 19 and commutator 20 carried by a main shaft 21 journalled in anti-friction bearings 22, 23 mounted in the main casing section 9; an upper brush 24 constantly resiliently urged into engagement with the commutator 20 of the motor rotor 19 by a spring 25, a lower brush 26 adapted to be moved into and out of contact with the motor commutator 20 by means of toggle mechanism confined within the handle 27 of the casing and adapted to be operated by a trigger 28; motion transmitting and speed reducing mechanism interposed between the motor shaft 21 and a rotary spindle 29 journalled in the casing in central alinement with the power outlet opening 30 at the barrel end 31 of the casing sections 9, 10; a ventilating fan 32 carried by the motor shaft 21 and cooperating with air inlet and discharge openings 33, 34 respectively formed in the casing sections 9, 10; and a flexible conductor cable 35 leading into the lower end of the handle 27 of the casing sections 9, 10, and being firmly secured to the main section 9 by means of a resilient clamp 36 coacting with an intervening cork pad or the like.

Figure 2:
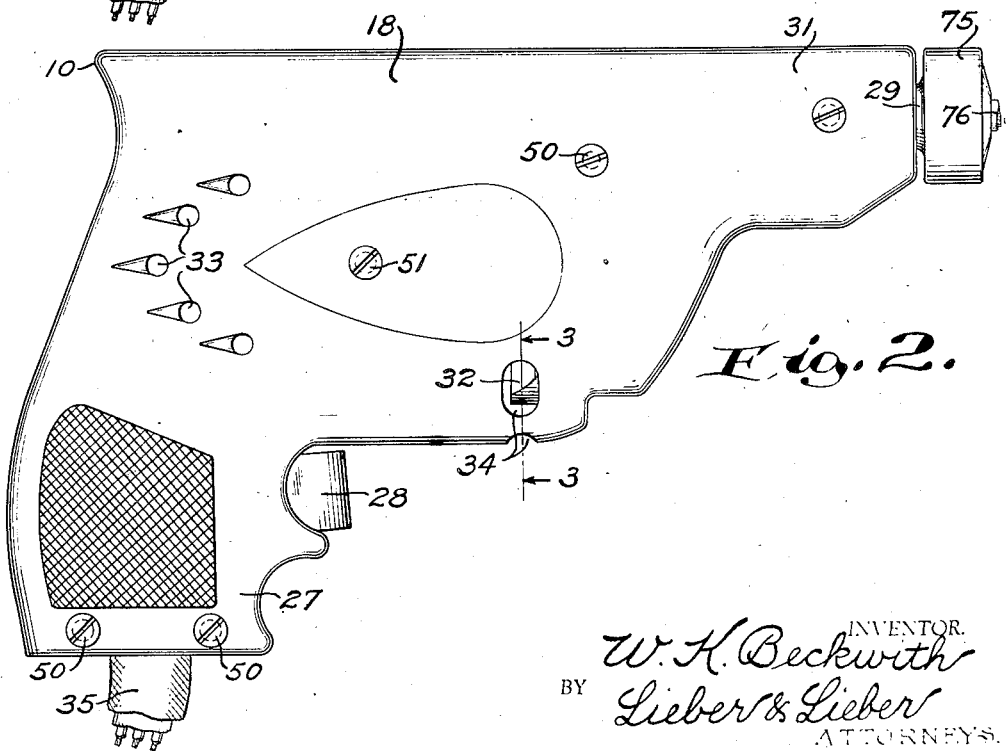
Fig. 2 is an outside view of the assembled tool looking toward the enclosing or cover section of the casing.

The housing casing sections 9, 10 may be formed either of light metal or of some durable non-metallic material such as plastic, and while both of these sections have approximately the same external appearance as shown in Fig. 2, and also have but a single set of machined plane surfaces 11 of mutual coaction; the internal construction of the main section 9 is more comprehensive than that of the cover section 10 as illustrated in Fig. 4, in order that the motor and the control and transmission mechanisms may be fixedly but detachably confined in the main section 9. In addition to having the motor field positioning pads 15, 16 formed therein, the main casing section 9 is provided with semi-circular upper and lower brush retaining sockets 37, 38 disposed in approximately vertical alinement with the casing handle 27, with other horizontally alined lower semi-circular sockets 39, 40 for snugly receiving the motor shaft bearings 22, 23 respectively, with still other horizontally alined upper semi-circular sockets 41, 42 for snugly receiving the journal bearings 43, 44 respectively, of the spindle 29, and with additional intermediate horizontally alined semi-circular sockets 45, 46 for likewise snugly receiving the journal bearings 47, 48 respectively of a counter shaft 49 which is disposed between the shaft 21 and spindle 29. While the plane surfaces 11 are preferably accurately machined or ground, the sockets 37, 38, 39, 40, 41, 42, 45, 46, may be pressed into proper shape and alinment with the aid of a punch, and no additional machining of the sections 9, 10 is required except for the drilling and tapping of a few holes. The two casing sections 9, 10 may be detachably interconnected by means of several screws 50, and the motor field 12 may be forced into engagement with the pads 15, 16 of the sections 9, 10 by means of screws 51 piercing bosses on the casing sections and having screw thread coaction with threaded holes in the core 12, see Fig. 5.

The electric motor which is housed entirely within and between the medial elliptical portions 17, 18 of the casing sections 9, 10, is of relatively standard construction; and the anti-friction or ball bearings 22, 23 in which the motor shaft 21 is journalled are fixedly but removably confined within the sockets 39, 40 respectively of the main casing section 9, by means of spring clips 52, 53 which are detachably secured to the section 9 by means of screws, as shown in Fig. 1. The laminated field core 12 of the electric motor may be assembled with the aid of the rivets 14, and may also be provided with the usual windings not shown, and when this core 12 is held in snug coaction with the pads 15, 16 of the main casing section 9 and with positioning flanges 54 formed on each of the casing sections 9, 10, with the aid of the clamping screw 51, the core should be centralized with respect to the motor rotor 19. It will be noted from Fig. 5, that the laminations 13 of the core assemblage are flattened on their opposite sides so as to properly coact with the pads 15, 16, and this flattening also makes it possible to utilize a relatively powerful motor having a rotor 19 of maximum diameter in an enclosing casing having minimum thickness through its elliptical portion 17, 18. The ventilating fan 32 is secured to the motor shaft 21 between the rotor 19 and the bearing 23, and is adapted to draw cooling air into the casing through the inlet openings 33, and to deliver the warm air from the main casing through the outlet openings 34.

The upper brush 24 which constantly engages the motor commutator 20, is slidably confined within a tubular guide 55 and is retained therein by means of a removable cap 56. This cap 56 is removable from the exterior of the main casing so as to permit free removal of the upper brush 24, and normally coacts with the upper end of the brush tensioning spring 25. The lower brush 26 which is movable to start and stop the electric motor, is slidably confined within a tubular guide 57 and is connected by means of another spring 58 to the swinging end of a toggle lever 59 which is swingable about spaced pivots 60 carried by a bracket 61 secured to the casing section 9, see Figs. 6 and 7. A toggle quadrant 62 which is swingably suspended upon the fixed pivots 60, has one pin 63 which is connected by a tension spring 64 to the medial portion of the lever 59, and another pin 65 which pivotally connects the inner end of the trigger 28 with the quadrant 62. Another tension spring 66 connects the pin 65 with a fixed portion of the main casing section 9, and this stronger spring 66 constantly tends to move the trigger 28 into the position shown in Figs. 1 and 6, wherein the movable brush 26 is held out of contact with the commutator 20 and the driving motor is at rest. However, when the trigger 28 is moved inwardly to the position shown in Fig. 7, the toggle spring 64 quickly becomes effective to move the brush 24 into engagement with the commutator 20 with a snap action, whenever the quadrant 62 has been swung in a clockwise direction to a position wherein the axis of the spring 64 crosses the pivots 60; but when the trigger 28 is released, the spring 66 moves the trigger outwardly and simultaneously swings the quadrant 62 in a counter-clockwise direction about the pivots 60, and the smaller toggle spring 64 again becomes active to remove the brush 24 from the commutator 20 with a similar snap action when the axis of the spring 64 again crosses the axis of the pivots 60. The brush guides 55, 57 are fixedly but detachably held within the sockets 37, 38 respectively of the casing section 9 by means of spring clips 67, 68, and two of the leads of the cable 35 are connected to the brushes 24, 26, while the third wire is grounded on the casing section 9 as shown in Fig. 1, and proper provision must be made to insulate the brushes from the casing sections 9, 10.

The mechanism for transmitting rotary motion at reduced speed from the motor shaft 21 to the driven spindle 29 through the counter-shaft 49, comprises a pinion 69 formed on the end of the main shaft 21 and coacting with a gear 70 secured to the shaft 49 near the ball bearing 47; and another pinion 71 secured to the shaft 49 near the roller bearing 48 and meshing with a gear 72 secured to the spindle 29 near the roller bearing 43. The bearings 47, 48 of the counter-shaft 49 may be fixedly but removably secured to the interior of the main casing section 9 by means of a removable spring clip 73, and the bearings 43, 44 of the spindle 29 may likewise be fixedly but removably attached to the interior of the same casing section 9 with the aid of a removable clip 74, so that by merely removing the screw 51 of the section 9 and the clips 36, 52, 53, 67, 68, 73, 74 after the casing cover section 10 has been removed, the motor, switch and transmission mechanisms may be independently removed from the supporting section 9. The outer end of the spindle 29 is preferably provided with an integral compact chuck assemblage 75 for drivingly attaching twist drills 76 or other rotary tools to the spindle 29, and in order to permit the portable electric tool unit to be used in cramped quarters such as corners, the periphery of the chuck 75 should not project outwardly beyond the barrel portion 31 of the casing.

During normal use of the improved portable electric tool assemblage, and assuming the various parts of the motor and of the control and transmission mechanisms to be properly positioned and secured within the main casing section 9, the cover section 10 should first be properly applied and attached to the main section 9 with the aid of the screws 50, 51 whereupon the tool is ready for use. A twist drill 76 or other similar implement may then be applied to the chuck 75, whereupon the propelling motor may be placed in operation by merely pressing against the trigger 28 so as to cause the lower brush 26 to engage the commutator 20. The motor rotor 19 will then be revolved at relatively high speed, causing the fan 32 to revolve and to circulate air through the enclosing housing, and the rotary motion of the motor rotor will be transmitted from the pinion 69 to the counter shaft 49 through the gear 70, and from the counter shaft 49 and pinion 71 to the spindle 29 and chuck 75 through the gear 72. The drill 76 will then be rotated at considerably lower speed than that of the motor rotor 19, and this rotation of the drill 76 will continue until the control trigger 28 is again released. Upon release of the trigger 28, the lower brush 26 will be quickly moved out of engagement with the commutator 20 and the motor rotor 19 will come to rest. Because of the fact that the lower brush 26 is moved into and out of engagement with the commutator 20 with a snap action, the brush 26 will serve as an effective switch for controlling the operation of the motor. In order to gain access to the motor and other internal structure which is normally housed within the main casing, it is only necessary to unscrew the screws 50 and to remove the cover section 10, whereupon the internal structure which is fixedly mounted within the casing section 9 will be entirely open for inspection but will remain in assembled condition within the main casing section 9. When the cover section 10 has been thus removed, the motor and transmission mechanism may be run idly for inspection purposes. The formation of the casing sections 9, 10 is obviously such that the tool can be readily manipulated and the flexible cable 35 will permit disposition of the unit in any desired position.

From the foregoing detailed description it will be apparent that my present invention provides an improved portable electric tool assemblage which is extremely simple, compact and durable in construction, and which is moreover highly flexible and efficient in use. The mounting of the motor and control and transmission mechanisms within one half section of the enclosing casing, and the removability of the cover section along a single plane surface 11, obviously permits convenient assembly and removal of parts, and also permits rapid and thorough inspection of the normally concealed mechanism with least waste of time. The provision of the retaining clips for normally holding the various elements within the main casing section 9, also facilitates assembly of the structure and removal of the various parts thereof; and the cover section 10 coacts with the anti-friction bearings 43, 44, 47, 47 so as to firmly clamp these bearing assemblages in place. The specific formation of the motor field core 12 and the mounting thereof within the casing sections, permits the use of a relatively powerful motor having a rotor 19 of maximum diameter without unduly enlarging the casing, and the trigger actuated toggle mechanism for moving the contact brush 26 into and out of engagement with the commutator 20 with a snap action, provides reliable means for effectively controlling the operation of the electric motor. The formation of the casing sections 9, 10 with a gripping handle portion 27 and a barrel portion 31 also facilitates manipulation of the tool and operation thereof in cramped quarters, and the handle 27 also makes it possible to advantageously utilize a control switch of the movable brush type without increasing the bulk of the tool unit. The formation of the chuck 75 integral with the spindle 29 is also an important feature since it produces a compact assembly, and the improved mechanism is of relatively simple construction and can therefore be manufactured at moderate cost. The co-operating housing casing sections 9, 10 may also be readily constructed at minimum cost due to the avoidance of complicated machining and the improved portable electric tool has proven highly satisfactory in actual use and dependable in service.

It should be understood that it is not desired to limit this invention to the exact details of construction or to the precise mode of use, herein shown and described, for various modifications within the scope of the claims may occur to persons skilled in the art.

I claim:

1. A portable electric tool, comprising, a casing having two closure sections provided with a pistol grip handle at one end and a power outlet opening at the opposite end, said casing sections coacting with each other along a single plane extending from end to end thereof and being detachable along said plane, an electric motor housed within the medial portion of said casing between said closure sections, means for directly attaching each of said casing sections to the field of said motor, means for transmitting motion from said motor through said outlet opening, and means associated with the handle end of said casing for controlling the operation of said motor, said motion transmitting and motor control means being fixedly mounted in one of said closure sections so as to remain therein when the other closure section is removed.

2. A portable electric tool, comprising, a casing having two closure sections provided with a pistol grip handle at one end and a power outlet opening at the opposite end, said casing sections coacting with each other along a single plane extending from end to end thereof, an electric motor housed within the medial portion of said casing between said closure sections and having a field composed of a series of laminations provided with flat areas on their opposite sides firmly secured directly to flat zones within the side casing sections so as to reduce the thickness of the assemblage to a minimum while permitting use of a motor rotor of maximum diameter, means for transmitting motion from said motor through said outlet opening, and means associated with the handle end of said casing for controlling the operation of said motor.

3. A portable electric tool, comprising, a casing having two closure sections provided with a pistol grip handle at one end and a power outlet opening at the opposite end, said casing sections coacting with each other along a plane extending from end to end thereof, an electric motor housed entirely within said casing between said two closure sections and being provided with a commutator and retractable brush assemblage confined entirely between the two closure sections within the confines of said plane of coaction thereof, means for transmitting motion from said motor through said outlet opening, and means associated with said handle for controlling the operation of said brush assemblage.

4. A portable electric tool, comprising, a casing having two closure sections provided with a pistol grip handle at one end and a power outlet opening at the opposite end, said casing sections coacting with each other along a plane extending from end to end thereof, an electric motor housed within the medial portion of said casing between said closure sections, means for transmitting motion from said motor through said outlet opening, and means associated with the handle end of said casing for controlling the operation of said motor, said motor control means including a brush movable toward and away from the motor commutator and a trigger actuated toggle mechanism for moving said brush in opposite directions with a snap action.

5. A portable electric tool, comprising, a casing having only two similar closure sections provided with a pistol grip handle at one end and a power outlet opening at its opposite end, said sections coacting with each other along a single central plane extending from end to end thereof and being detachable only at said plane, an electric motor normally entirely concealed by said two closure sections and having an armature and commutator and brush mechanisms fixedly mounted directly in one of said closure sections so as to remain attached thereto and completely exposed when the other section is removed, means for transmitting motion from said motor through said outlet opening, and manually operable means associated with the handle end of said casing for controlling the operation of said motor.

6. A portable electric tool, comprising, a casing having only two similar closure sections coacting with each other along a single central plane extending from end to end thereof and being provided at one end with a pistol grip handle and at its opposite end with a power outlet opening both bisected by said plane, and an electric motor and motion transmitting mechanism normally entirely concealed by said two closure sections alone and being fixedly secured within one of said casing sections only so as to remain attached to said section but completely exposed when the other casing section is removed along said plane of coaction and said first mentioned section is inverted.

7. A portable electric tool, comprising, a casing having a pair of similar closure sections coacting with each other along a single central plane extending from one extreme end of the casing to the other and being provided with a pistol grip handle at one end and with a power outlet opening at its opposite end both bisected by said plane, and an electric motor and motion transmitting mechanism normally completely concealed and confined between said closure sections alone, the bearings of said motor and of said transmission mechanism being fixedly attached directly within one of said closure sections so as to entirely expose said motor and mechanism and to permit operation thereof in inverted position when the other section is removed along said plane of coaction.

8. A portable electric tool, comprising, a casing having a pair of similar closure sections coacting with each other along a single plane extending from one extreme end of the casing to the other and being provided with a piston grip handle at one end and with a power outlet opening at its opposite end both bisected by said plane, and an electric motor and motion transmitting mechanism normally completely concealed and confined between said closure sections alone, said motor having a commutator and brush mechanism fixedly mounted in the handle end of one of said sections and being entirely exposable to view upon separation of said casing sections at said plane of coaction.

9. A portable electric tool, comprising, a two-part housing having only two similar closure sections coacting with each other along a single plane and being provided with a pistol grip handle at one end and with a power outlet at its opposite end both bisected by said plane, an electric motor having an armature and field normally concealed between the medial portions of said closure sections alone and also having a commutator and brush mechanism normally concealed between the handle portions of said sections, and motion transmitting mechanism normally concealed between the power outlet portions of said closure sections, all of said normally concealed elements being attached directly to only one of said closure sections so as to positively prevent displacement during operation thereof when the other section is removed.

10. A portable electric tool, comprising, a two-part housing having only two similar closure sections coacting with each other along a single plane and being provided with a pistol grip handle at one end and with a power outlet at its opposite end both bisected by said plane, an electric motor having an armature and field normally concealed between the medial portions of said closure sections alone and also having a commutator and brush mechanism normally concealed between the handle portions of said sections, and motion transmitting mechanism normally concealed between the power outlet portions of said closure sections, all of said normally concealed elements being detachably secured directly to only one of said closure sections so as to permit removal of the other closure section and inversion of the first mentioned section without displacing the elements from their carrying section.

11. A portable electric tool, comprising, a casing having only two closure sections coacting with each other in clamshell fashion along a single plane extending from end to end of the casing and being provided at one end with a pistol grip handle and at its opposite end with a power outlet opening both bisected by said plane, and power means including an electric motor and motor control and motion transmitted mechanisms completely concealed and supported only by said two sections and having journal bearings fixedly secured in semi-circular sockets in one section with the central bearing axes lying in said plane.

WENDELL K. BECKWITH.